Dec. 9, 1930.  J. A. McCASKELL  1,784,372
CAKE DISCHARGING MEANS FOR PRESSURE FILTERS
Filed Oct. 7, 1925  3 Sheets-Sheet 2
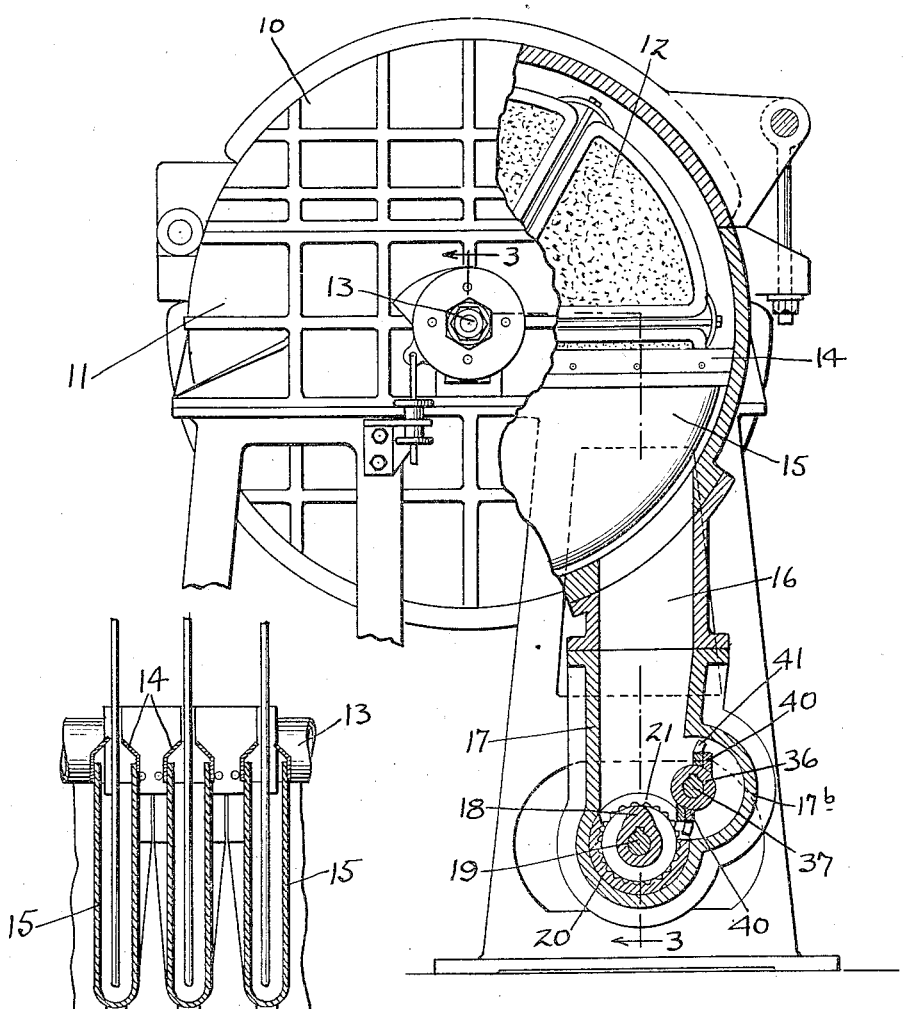
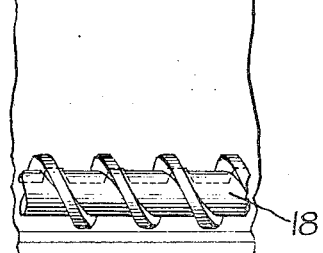
INVENTOR
JASPER A. McCASKELL
BY
ATTORNEYS

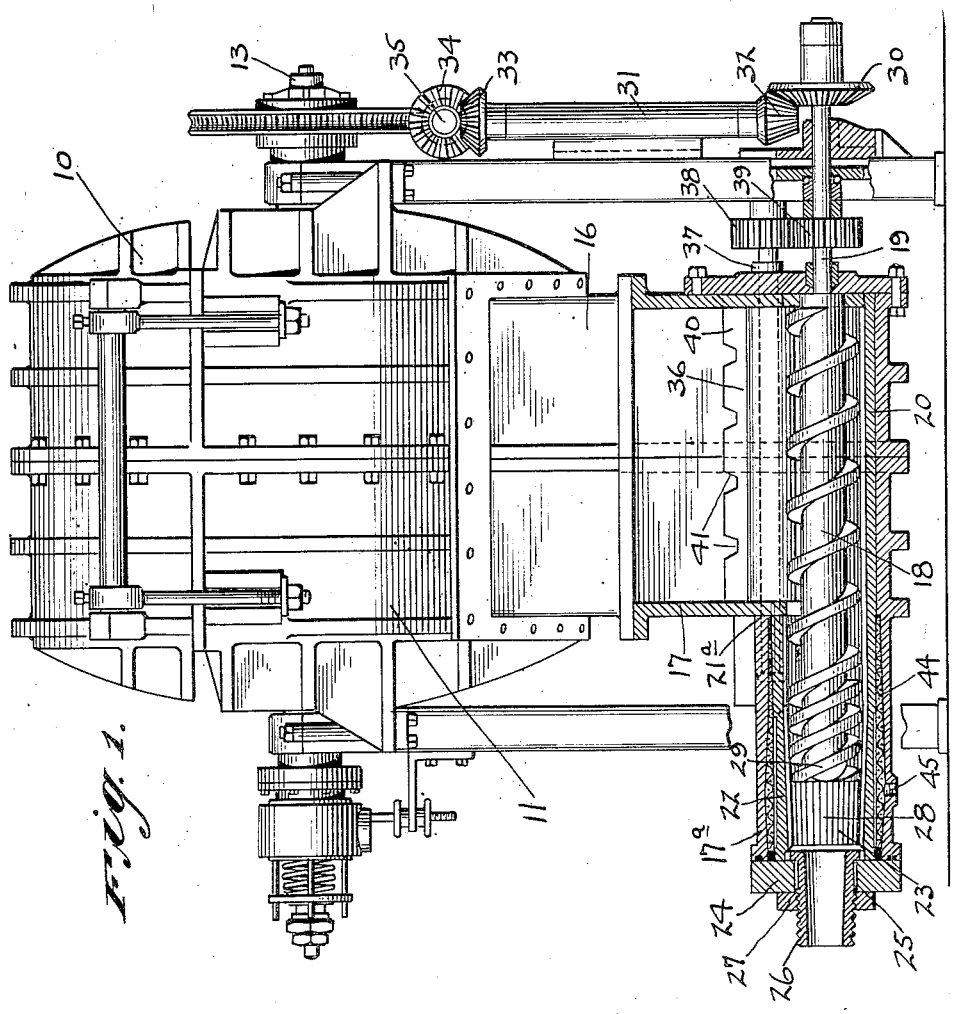

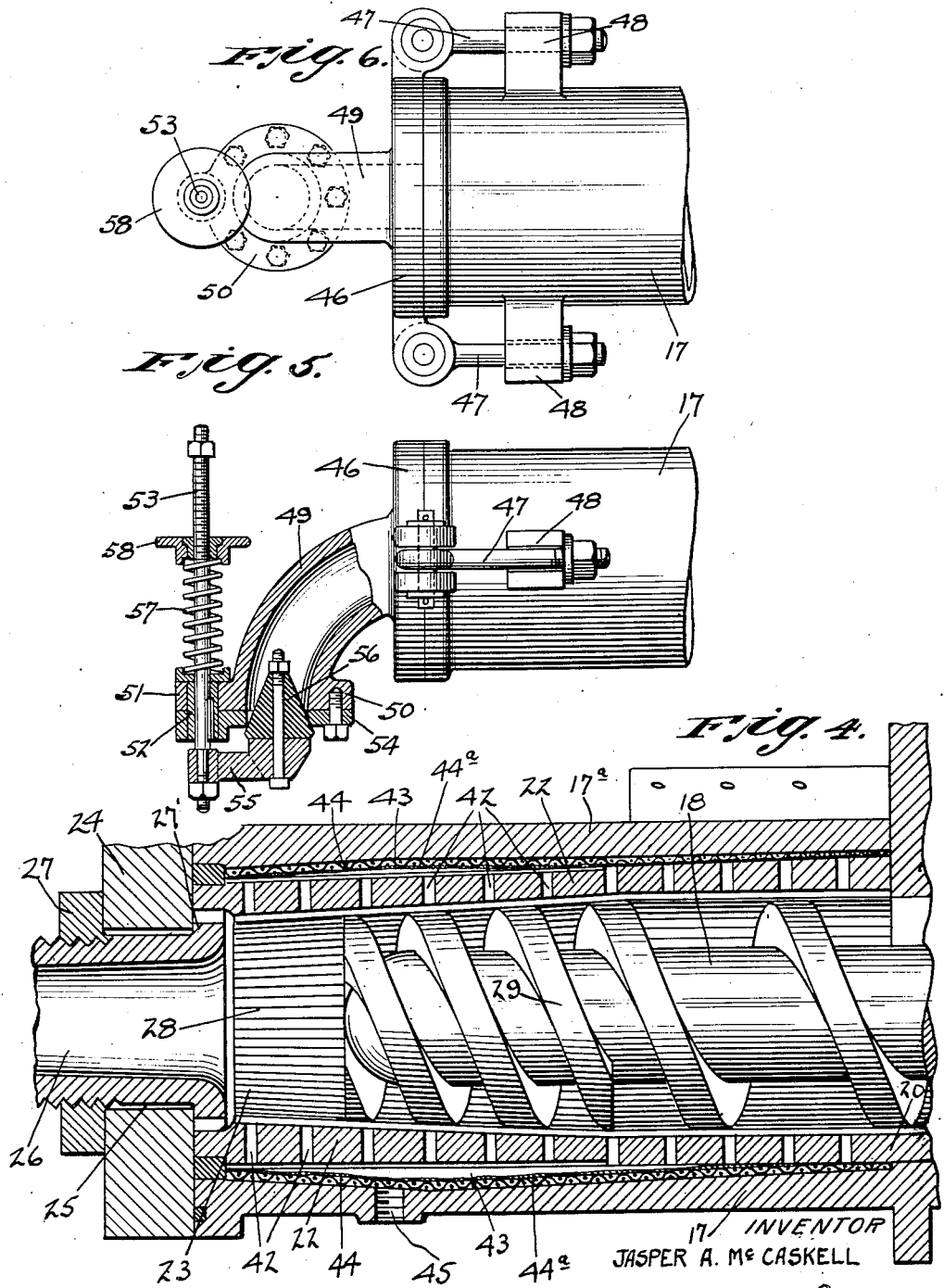

UNITED STATES PATENT OFFICE

JASPER A. McCASKELL, OF SALT LAKE CITY, UTAH

CAKE-DISCHARGING MEANS FOR PRESSURE FILTERS

Application filed October 7, 1925. Serial No. 61,152.

This invention relates to continuous pressure filters and more especially to a device for discharging the filter cake therefrom.

One of the objects of the invention is to provide a means for continuously removing the filter cake from the filter.

Another object of the invention is to provide a means for adequately sealing the discharge opening against the passage of air therethrough, while permitting continuous discharge of the cake therefrom.

Another object of the invention is to provide a means to extract more of the liquid from the filter cake than is extracted in the ordinary filter in common use, whereby a dryer cake is produced permitting the use of the compacted cake as a stopper to prevent escape of the pressure fluid from the filter.

Other objects of the invention will appear as the description of the invention proceeds.

In the drawings in which I have illustrated one embodiment of my invention:

Figure 1 is a side elevational view partly in section of a filter embodying my invention;

Figure 2 is an end view, partly in section of the filter shown in Figure 1;

Figure 3 is a sectional view taken on the line 3—3 of Figure 2;

Figure 4 is an enlarged sectional view of a portion of the discharge mechanism of the filter;

Figure 5 is a sectional elevational view of a valve used with a modified form of discharge opening; and Figure 6 is a plan view of the valve shown in Figure 5.

Referring more specifically to the drawings in which like parts are represented by like characters throughout, the filter 10, which is of the continuous pressure type, is composed of a casing or housing 11 in which a series of filter elements or leaves 12 or a filter drum is mounted on a hollow rotatable shaft 13 through which the filtrate is drawn off. Sludge is admitted to the inside of the casing 11 and the casing 11 is put under pressure to force the filtrate through the filtering medium and out the hollow shaft 13. The flow of the filtrate through the filter disks or leaves 12 deposits a cake which is continuously scraped off by the scrapers 14 and permitted to drop between the tanks 15 surrounding the lower portion of each filter leaf into a closed chute 16. The scrapers 14 are attached to the upper edges of the tanks 15 which are preferably about even with the hollow shaft 13.

This type of filter is described with more detail in my prior Patent No. 1,266,133 issued May 14, 1918.

Inasmuch as the casing 11 and chute 16 are continuously under pressure to force the filtrate through the filter leaves, it is necessary to either intermittently stop the filtration, discharge the pressure medium and remove the cake which has accumulated in the chute 16 or to provide some means for automatically removing the cake from the chute 16 without permitting escape of the pressure medium. It is this latter purpose with which this invention is concerned.

The discharge mechanism I have provided comprises a casing 17 which is connected directly beneath the chute 16, and has an extension 17a projecting therefrom. A worm 18 mounted on a shaft 19 and keyed thereto is rotatably mounted within a cylindrical inner casing 20, the inside surface of which is corrugated and the whole contained within and being attached to the lower portion of the inside of the casing 17—17a. An opening or cut away portion 21 in the inner casing 20 is directly beneath the chute 16 and is adapted to receive the filter cake as it drops down the chute.

The casing 20 is tapered at one end 22 so that a restricted outlet 23 is formed therein, and the cut away portion 21 leaves a shoulder 21a which abuts the side wall of the casing 17 to position the inner casing therein and prevent rotation thereof. A cap 24 having an opening 25 therein, is attached to the end of the extended portion 17a of the casing 17 and holds the inner casing 20 in place. A nozzle bushing 26 through which the filter cake is discharged, is secured in the opening 25 by the nut 27 and flange 27'.

The end of the worm 18 is tapered to fit in the tapered portion 22 of the casing 20 but does not extend all the way to the end of the casing, there being a space 28 between the end of the worm 18 and the nozzle bushing 26. An extra screw thread 29 is disposed between the threads of the worm 18 for a short distance from the end thereof so that the tapered end of the worm is provided with a double screw to firmly compact the cake in the space 28 while that part of the worm which is beneath the opening 21 has a single screw thread to convey the cake toward the space 28.

The shaft 19 upon which the worm 18 is mounted has a bevel gear 30 attached to the end thereof and is driven by means of an auxiliary shaft 31 which has bevel gears 32 and 33 attached to the lower and upper ends respectively and meshing with the gear 30 and a bevel gear 34 attached to the main driving shaft 35 of the filter.

A feeder 36 for pressing the cake into the grooves in the worm 18 is mounted on an auxiliary shaft 37 which is rotatably mounted in an enlargement 17b in the casing 17 and has a gear 38 keyed thereto which meshes with a gear 39 keyed to the shaft 19. The feeder 36 is composed of two paddles 40 which revolve about the shaft 37 and are provided with notches 41 which permit the edges of the paddles to pass down between the threads on the worm 18 when the shaft 37 is rotated. The shaft 37 turns at the same speed as the shaft 19 and hence the notches 41 in passing the worm 18 always register with the threads thereon.

The tapered end 22 of the inner casing 20 is provided with a plurality of holes 42 through the walls thereof which open into a space 43 between the tapered end 22 of the inner casing 20 and the extended portion 17a of the casing 17. A filter medium 44 composed preferably of a filter cloth 44a protected by a wire mesh 44 is wrapped around the end 22 of the inner casing 20 adjacent the holes 42 therein to filter any sludge which is forced through the holes, such filtrate passing off through the opening 45 in the bottom of the casing 12.

In operating the filter, the filter cake is scraped off the filter leaves as has already been described and falls through the chute 16 into the casing 17, where it is moved toward the nozzle 26, by the worm 18. The paddles 40 of the feeder 36 force the cake into the worm 18 and insure its being moved thereby. When the cake reaches the tapered end of the casing it is compressed and compacted by the extra thread 29, on the end of the worm 18. The nozzle 26 is also tapered and smaller in diameter than the casing 20 and hence the cake is compressed into the space 28 where a portion of the liquid is driven off, before it is forced through the nozzle 26. The tightly compressed cake in the nozzle 26, compression space 28 and between the threads of the worm acts as a seal which prevents the air under pressure in the filter from escaping while the solid cake may be continuously discharged from the end of the nozzle 26. The liquid which is squeezed out of the filter cake passes through the holes 42, the filter 44 and out the opening 45 in the casing.

I have found the tapered nozzle 26 sufficient in discharging cakes which are dry and which compact without permitting escape of the pressure fluid from the filter, but when there is not sufficient friction between the cake and the sides of the nozzle, as in the case of slimy or talcy cake, I have found the construction shown in Figures 5 and 6 desirable. In place of the cap 24 a cap 46 may be used. This cap may be attached to the casing 17 in the same manner as the cap 24 by means of the eye-bolts 47 engaging with the lugs 48 on the casing. A long radius elbow 49 disposed in a downward direction, is made integral with the cap 46 and has a flange 50 at its lower end which has an extended portion 51 adapted to support a bearing 52 for a valve stem 53. A valve seat 54 is bolted to the flange 50. An arm 55 is attached to the lower end of the valve stem 53 and a resilient cone-shaped valve 56 is attached to the end of the arm. The valve 56 is so disposed that when the valve stem 53 is raised the vertex thereof passes up into the opening in the valve seat 54 and elbow 49 and closes the opening therethrough. The valve 56 is normally kept in this closed position by a spring 57 which may be adjusted by a wheel 58. When the slimy cake is forced through the elbow 49 it opens the valve 56 and passes between the valve and the valve seat 54. A pressure slightly in excess of that in the filter is kept on the valve 56 by the spring 57 so as to permit the cake to pass through only when fed out by the worm and to keep the elbow 49 and the compression space 28 filled with cake so that none of the air in the filter will leak out through the valve.

While I have illustrated in the drawings a screw conveyor or worm for forcing the cake into the restricted space 28, other means may be used for this purpose such as a plunger reciprocating within the inner casing 20 and allowing the cake to drop into the casing in front of the plunger at each backward stroke thereof.

It will be evident from the foregoing that I have provided a device for continuously removing cake from filters without permitting the leaking of any of the air out of the filter through the discharge opening and that I have provided at the same time a means to squeeze out more of the liquid from the filter cake than has been done heretofore to discharge a filter cake.

Many changes from the form of embodiment of the invention illustrated in the drawings may be made without departing from the spirit of the invention and I do not therefore desire to limit my invention to the particular embodiment shown and described but to interpret it broadly within the scope of the appended claims.

I claim:

1. In a continuous pressure filter of the class described, a closed casing adapted to receive material to be filtered, a rotating leaf filter medium partially submerged in the liquid to be filtered, means to subject the filter medium and the liquid to be filtered to a super-atmospheric gaseous pressure, means to dislodge filter cake from the filter medium and discharge said cake into a cake receiving compartment communicating with said casing and subjected to said super-atmospheric gaseous pressure, and means to discharge the filter cake from said compartment without loss of said pressure which comprises a screw conveyor, a discharge valve at the end of said conveyor, said valve having a conical end thereon, and resilient means to actuate said valve to oppose the discharge of said filter cake with a pressure proportional to said super-atmospheric pressure.

2. In a continuous pressure filter of the class described, a closed casing adapted to receive material to be filtered, a rotating leaf filter medium, partially submerged in the liquid to be filtered, means to subject the filter medium and the liquid to be filtered to a super-atmospheric gaseous pressure, means to dislodge the filter cake from the filter medium and discharge said cake without loss of pressure, which comprises a cake discharge compartment subjected to said super-atmospheric gaseous pressure, a screw conveyor in said compartment, a discharge valve at the end of said conveyor, said valve having a conical end thereon, and elastic means to actuate said valve to oppose the discharge of said filter cake with a pressure proportional to said filter pressure.

3. In a continuous pressure filter of the class described, a closed casing adapted to receive liquid to be filtered, a rotating leaf filter medium partially submerged in the liquid to be filtered, means to subject the filter medium and the liquid to be filtered to a super-atmospheric gaseous pressure, means to discharge the filter cake from from said filter medium comprising a cake compartment below said casing and subjected to said super-atmospheric gaseous pressure, a screw conveyor to convey the cake from said compartment, and a restricted discharge nozzle against which the cake forms a plug to allow the filter cake to be forced therethrough by the screw pressure without the loss of said gaseous pressure from said filter.

4. In combination with the pressure filter of the class described, having a closed casing adapted to receive material to be filtered and having a filter medium with means to subject the filter medium to a gaseous filter pressure in excess of atmospheric pressure, and means to discharge the filter cake without loss of pressure, including a discharge compartment adapted to receive this dislodged filter cake from said filter medium and subjected to said gaseous filter pressure, a screw conveyor in said compartment, adapted to convey said filter cake thru a discharge opening at the end of said conveyor, said screw conveyor having an additional thread adjacent the end to additionally compress the filter cake, a filter screen adjacent the end of said discharge conveyor and adapted to filter out additional liquid pressed out of said filter cake by said discharge means, and a resiliently operated valve adjacent said discharge opening adapted to oppose the discharge from said conveyor with a pressure adjustable and proportional to the pressure within said casing.

5. In combination, a pressure filter, a cake discharger comprising an outer casing having a restricted opening in the end and a drainage opening in the lower side thereof, an inner casing having a relatively large opening in its upper side near one end and a plurality of small holes in the sides near the opposite end thereof, a screw conveyor rotatably mounted within said inner casing, feeding means mounted adjacent the large opening in said inner casing, a filtering medium around said inner casing adjacent the small holes therein, and means to rotate said conveyor and said feeding means.

6. In combination, a pressure filter, a substantially cylindrical casing having a corrugated internal surface, a screw conveyor rotatably mounted within said casing, and being a little shorter in length than said casing, said conveyor comprising a single threaded screw running the length of said conveyor and an auxiliary thread disposed between the threads on said screw for a portion of the length thereof and a closure having a restricted discharge opening for the discharge end of said casing.

7. In combination, a pressure filter, a substantially cylindrical casing having a corrugated internal surface tapered at one end, a screw conveyor rotatably mounted within said casing a little shorter in length than said casing and having a tapered end to conform to said casing, feeding paddles rotatably mounted adjacent said conveyor, means to rotate said conveyor and said feeding paddles and a closure for said casing having a restricted discharge opening therethrough adjacent said inner surface.

8. In combination with a pressure filter a discharge valve for filter cake comprising a valve seat, a valve stem slidably mounted adjacent said seat and perpendicular to the plane of said seat, an arm rigidly attached to the end of said valve stem and a resilient valve attached to said arm and adapted to fit into said valve seat, and means urging said valve stem to yieldingly hold said valve against said seat.

9. In combination with a pressure filter, a discharge valve for filter cake, comprising a substantially horizontal valve seat, a valve stem slidably mounted adjacent said valve seat, a conical resilient valve disposed adjacent said valve seat, an arm connecting said valve with said valve stem and a spring to normally hold said valve stem in position whereby said valve is yieldingly pressed against said valve seat.

10. The combination in a continuous pressure filter comprising a casing to receive the liquid to be filtered, a rotating filter medium and means to admit a gaseous fluid under pressure to said casing, means to remove the filter cake formed on said filter medium, a filter cake receiving chamber, subjected to said gaseous pressure medium, said chamber having an opening in the end thereof, screw means to convey the cake toward said opening, said screw means ending short of the end of the chamber having the opening, providing a space whereby the cake is compacted in said opening, said opening being of substantially less area than any area in the cake receiving chamber whereby the cake is regularly discharged under a greater pressure than the filter pressure and the escape of the gaseous pressure fluid from said filter is prevented.

In testimony whereof I have affixed my signature to this specification.

JASPER A. McCASKELL.